UNITED STATES PATENT OFFICE.

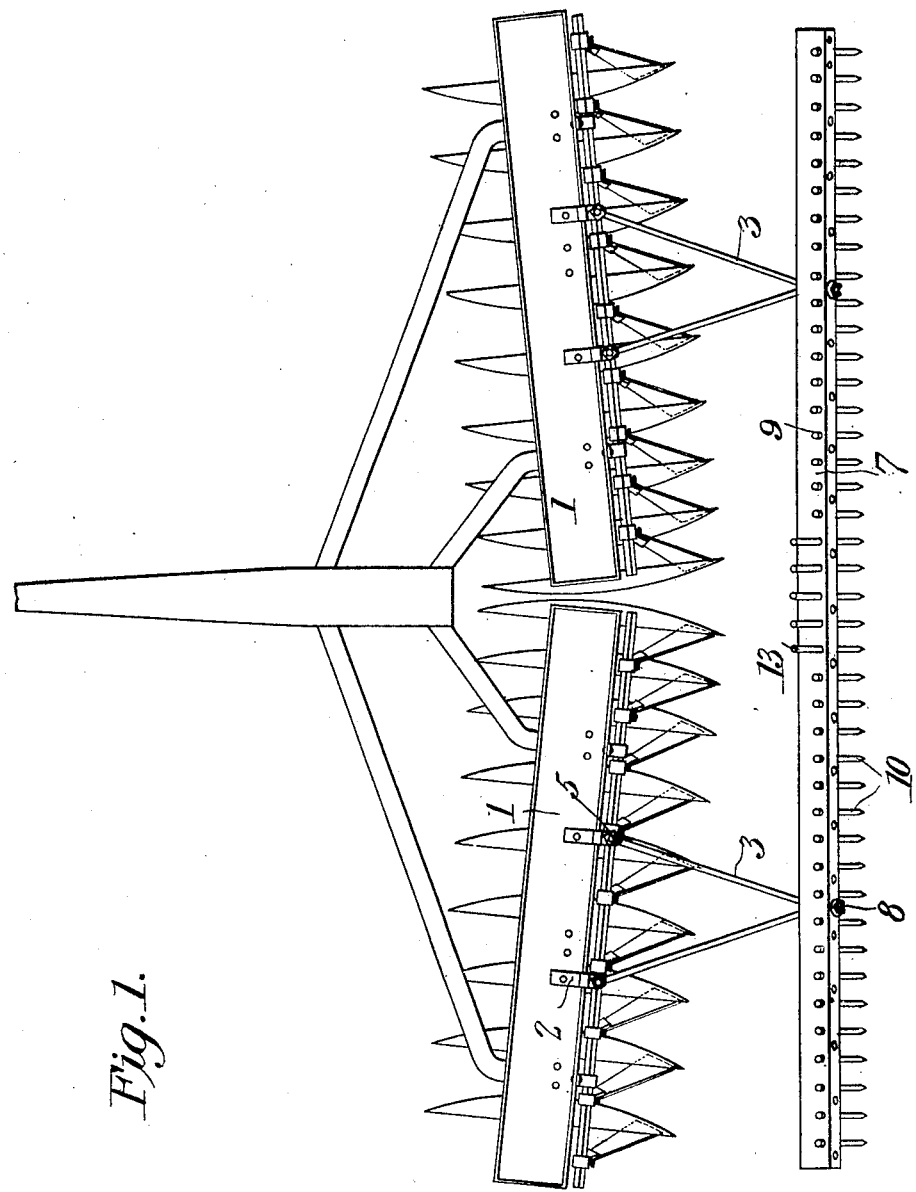

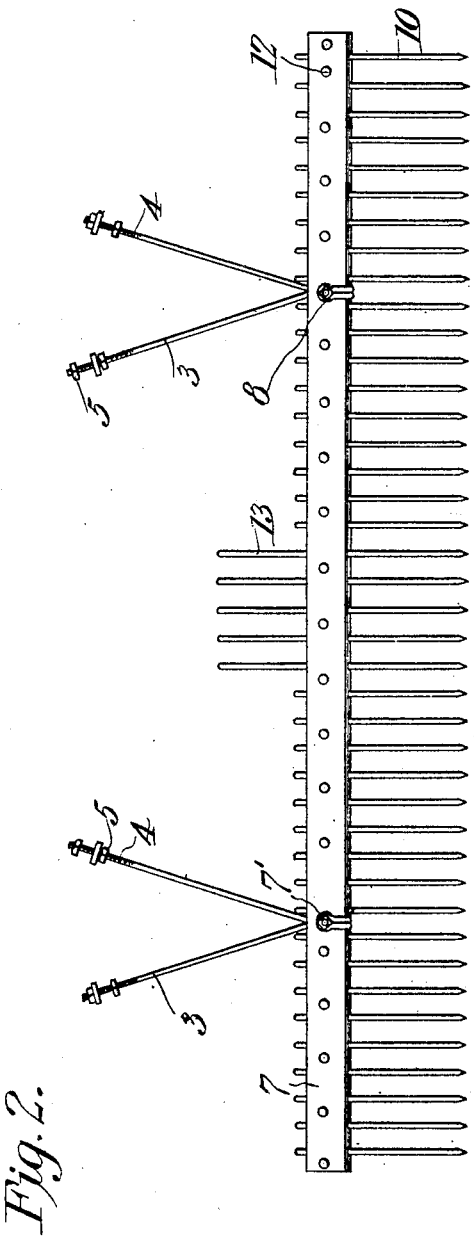
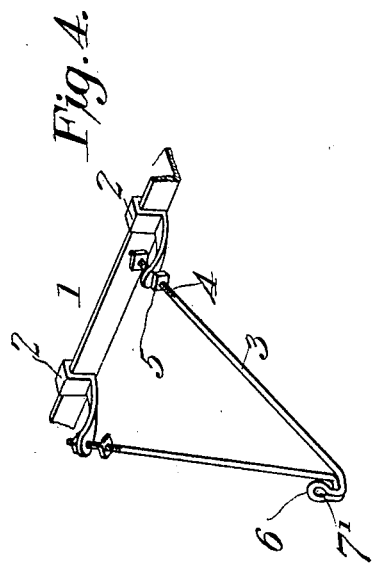
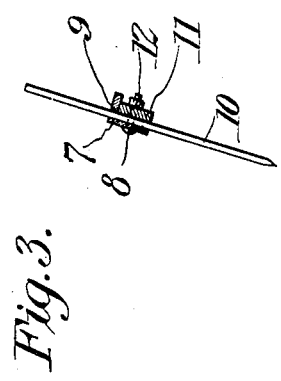

EDWARD SCHULTZ, OF CHENOA, ILLINOIS.

HARROW ATTACHMENT.

No. 869,660.   Specification of Letters Patent.   Patented Oct. 29, 1907.

Application filed July 15, 1907. Serial No. 383,752.

*To all whom it may concern:*

Be it known that I, EDWARD SCHULTZ, a citizen of the United States, residing at Chenoa, in the county of McLean and State of Illinois, have invented a new and useful Harrow Attachment, of which the following is a specification.

This invention has relation to harrow attachments and it consists in the novel construction and arrangement of its parts as hereinafter shown and described.

The object of the invention is to provide an attachment especially adapted to be used in connection with harrows made up of sections and which consists of a member which is, in length, equal, substantially, to the combined length of all of the harrow sections and means of special construction are provided for connecting the said member with the several harrow sections.

The attachment is especially adapted to be used in combination with a disk harrow and trails behind the same and pulverizes and evens the soil in order that it may be in proper condition to operate a planter upon.

In the accompanying drawings:—Figure 1 is a top plan view of a harrow with the attachment applied thereto. Fig. 2 is a side elevation of a harrow attachment. Fig. 3 is a transverse sectional view of a harrow attachment, and Fig. 4 is a perspective view of one of the means for connecting the attachment with the harrow.

As illustrated in Fig. 1 the attachment is applied to a disk harrow which is made up of the sections 1, 1. Each of said sections is provided with a pair of lugs 2. The Y-shaped connecting arms 3 are screw-threaded at their extremities as at 4 and the nuts 5, 5 engage the threads 4 at the extremities of the arms 3 and are located upon opposite sides of the lugs 2 through which the extremities of the said arms pass. The nuts 5 are spaced apart sufficiently in order that the side portions of the arms may have sufficient longitudinal play or movement in the perforations of the lugs 2. The arms 3 are provided at their apices with the hooks 6 each of which is provided with an eye 7'. The said hooks 6 pass under the bar 7 which forms the upper portion of the harrow attachment and the said arms are secured to said bar by means of the bolts 8 which pass transversely through the bar and lie in the eyes 7' of the said hooks 6. The bar 7 is formed or cut from angle iron with the perforations 9 through the top side adjacent the rear side. The teeth 10 pass through the perforations 9 and lie directly against the forward surface of the rear side of the bar 7. The clamping bar 11 lies under the top side of the bar 7 and bears against the opposite sides of the teeth 10 and is held in position by means of the bolts 12 which pass transversely through the bar 7 and the said clamping bar 11. The bar 7, in length, is substantially equivalent to the combined length of the harrow sections 1 and as it is attached to each harrow section it operates upon the ground for a breadth equal to that that the harrow operates upon the ground. Said bar 7 is provided at its middle or behind adjacent ends of the harrow sections 1 with the teeth 13 which are longer than the teeth 10 and may be adjusted between the bars 7 and 11 so as to operate at a greater distance below the surface of the soil. Thus, the said teeth 13 may thoroughly pulverize the soil that is not touched by the soil engaging members of the adjacent harrow sections and also level the same. All of the teeth of the harrow attachment are designed to pulverize the soil in the wake of the harrow and level the same sufficiently so that a planter may effectually operate upon the soil. By reason of the fact that the nuts 5, 5 located upon the same extremities of the arm 3 are spaced apart the harrow attachment may have a limited movement up and down with relation to the harrow and thus the said attachment may follow the surface of the soil irrespective of the harrow and vice versa.

Having described my invention what I claim as new and desire to secure by Letters-Patent is:—

1. In combination with a harrow made up of sections, a harrow attachment connected with the respective harrow sections and consisting of a bar substantially equal in length to the combined length of the harrow sections, teeth mounted upon said bar, those teeth occurring immediately behind the adjacent ends of the harrow section being greater in length than the remainder of the teeth.

2. In combination with a harrow made up of sections each having perforated lugs, a harrow attachment consisting of a bar, teeth carried by the bar, arms attached to the bar and passing through said lugs and nuts located upon said arms upon opposite sides of the lugs and being spaced apart whereby the arms may have longitudinal movement through the lugs.

3. In combination with a harrow made up of sections, each section having a pair of lugs provided with perforations, Y-shaped arms passing through the perforations of the lugs and having limited movement therein, said arms being provided at their apices with hooks provided with eyes, a bar located in said hooks, bolts passing through the bar and the eyes of the hooks and teeth carried by said bar.

4. In combination with a harrow made up of sections each having a pair of perforated lugs, arms having their extremities passing through the perforations of said lugs and having limited movement therein, the intermediate portion of said arms being hooked, a bar located in the hooked portion of said arms, said bar being angular in cross section, teeth passing through one of the sides of the bar and lying against the other side thereof and a clamping bar located under that side of the first said bar through which the teeth pass and bearing laterally against the teeth and clamping bolts securing said bars together.

In testimony that I claim the foregoing as my own, I have hereto affixed my signature in the presence of two witnesses.

EDWARD SCHULTZ.

Witnesses:
A. D. JORDAN,
VICTOR L. NICKEL.